United States Patent [19]

Visos et al.

[11] 3,776,268
[45] Dec. 4, 1973

[54] STEPPED OPENING FLUID PRESSURE OPERATED GAS VALVE

[75] Inventors: Charles D. Visos, Manchester; John J. Love; Carl A. Smith, both of St. Louis, all of Mo.

[73] Assignee: Emerson Electric Co., St. Louis, Mo.

[22] Filed: June 2, 1972

[21] Appl. No.: 259,335

[52] U.S. Cl. ............................... 137/495, 137/489
[51] Int. Cl. .......................................... F16k 31/365
[58] Field of Search ...................... 137/495, 505.14, 137/494, 489, 497.5; 251/33, 35, 36, 61; 236/1, 9, 80

[56] References Cited
UNITED STATES PATENTS

| | | | |
|---|---|---|---|
| 3,351,085 | 11/1967 | Allingham | 137/495 |
| 3,354,901 | 11/1967 | Dietiker et al. | 137/495 |
| 3,526,360 | 9/1970 | Ray | 137/495 X |

*Primary Examiner*—Henry T. Klinksiek
*Assistant Examiner*—Robert J. Miller
*Attorney*—Charles E. Markham

[57] ABSTRACT

A stepped opening, diaphragm operated gas valve in which the operating pressure applied to the diaphragm is controlled by a spring biased pressure regulator and a delayed action pressure responsive actuator operating on an initial relatively low pressure acts, following a short delay, to increase the regulator spring bias, thereby to increase the controlled pressure and effect greater opening movement of the gas valve. An operative connection between the pressure responsive actuator and the regulator biasing spring includes means operative to transmit greater force and less movement during initial response of the actuator to the relatively low controlled pressure and greater movement and less force upon subsequent response of the actuator to the relatively greater controlled pressure developed as a consequence of the initial force and movement.

3 Claims, 5 Drawing Figures

STEPPED OPENING FLUID PRESSURE OPERATED GAS VALVE

This invention relates to fluid pressure operated gas valves and particularly to means providing a stepped opening movement of the valve in order to provide an initial partial flow of gas to a burner and delay the full flow of gas thereto until sufficient air draft through the combustion chamber is established by combustion of the partial flow to support combustion of the full flow.

Means for accomplishing the stepped opening movement of a diaphragm operated gas valve by regulating the operating pressure in the diaphragm chamber initially at one value to effect a partial opening of the gas valve and then, after a short delay, at a different value to effect full opening of the gas valve is shown and described in U. S. Pat. No. 3,300,174 to Donald C. Urban et al. In this arrangement, two series connected pressure regulating valves are employed to regulate the pressure in the diaphragm chamber at two different values and a delayed action pressure responsive actuator renders one of the pressure regulating valves inoperative after a short period of time.

The co-pending application of Charles D. Visos et al., Ser. No. 197,438, filed Nov. 10, 1971, now U.S. Pat. No. 3,721,263 discloses means for accomplishing this function in a similar manner, but with a single pressure regulating valve. In this arrangement, a delayed action pressure responsive actuator is operative after a short delay to increase the spring closing bias on the single pressure regulating valve, thereby to increase the operating pressure in the main diaphragm chamber and effect the full opening of the gas valve.

It has been found that the initial controlled operating pressure required to effect the desired initial partial opening of the gas valve may, in some instances, be quite low and insufficient to effect, through a pressure responsive actuator, the necessary increase in regulator spring bias unless the area of the actuator diaphragm is made unduly large. It will be seen that if the pressure responsive actuator is ineffective at some relatively low operating pressure to substantially increase the regulator spring bias, the main gas valve will not be opened beyond an initial partially open position.

On the other hand, if the pressure responsive actuator is capable of effecting some initial substantial increase in the regulator spring bias in response to a relatively low initial operating pressure, the resulting increase in operating pressure will effect a further increase in regulator spring bias which, in turn, will further increase the operating pressure and so on until some limiting stop means terminates this cumulative action at some predetermined operating pressure. It will be apparent, therefore, that suitable means operative to multiply the force available to increase the regulator spring bias under low operating pressure conditions will insure stepped opening operation under low operating pressure conditions and permit a reduction in the area of the diaphragm of the pressure responsive actuator.

Further, inasmuch as an initial substantial increase in regulator spring bias will effect a progressive increase in the operating pressure, the necessity of continuing force multiplication as the actuator continues to respond is obviated. By reducing or eliminating force multiplication after it has served its purpose in initiating an increase in operating pressure, greater movement may be imparted by the actuator to the regulator biasing spring as the actuator continues to respond to increasing pressure. This is important because the flexing of the actuator diaphragm is limited, and the movement required to effect the desired change in bias of the conventional, relatively soft, regulator biasing spring is considerable.

An object of this invention is to provide a generally new and improved fluid pressure operated gas valve in which stepped opening operation of the valve is effected by applying a first operating pressure to effect partial opening of the valve and then, after a short delay, applying a second operating pressure of different value to effect full opening of the valve. The operating pressure is controlled by spring biased pressure regulating means, the spring bias of which is increased by a delayed action pressure responsive actuator to effect the change from the first to second operating pressure values.

A further object is to provide a stepped opening fluid pressure operated valve, as above, in which the pressure responsive actuator is responsive to a relatively low pressure to effect an increase in the regulator spring bias and in which force multiplying means between the actuator and the regulator biasing spring is provided.

A further object is to provide a stepped opening fluid pressure operated valve, as above, in which the valve operating pressure increases as the regulator spring bias is increased and in which means forming an operative connection between the pressure responsive actuator and the regulator biasing spring is effective to initially multiply the force applied by the actuator to the regulator spring and to subsequently multiply the movement applied by the actuator to the regulator biasing spring as the actuator continues to respond to increased operating pressure.

Further objects and advantages will appear from the following complete description when read in connection with the accompanying drawings.

Figure 1:
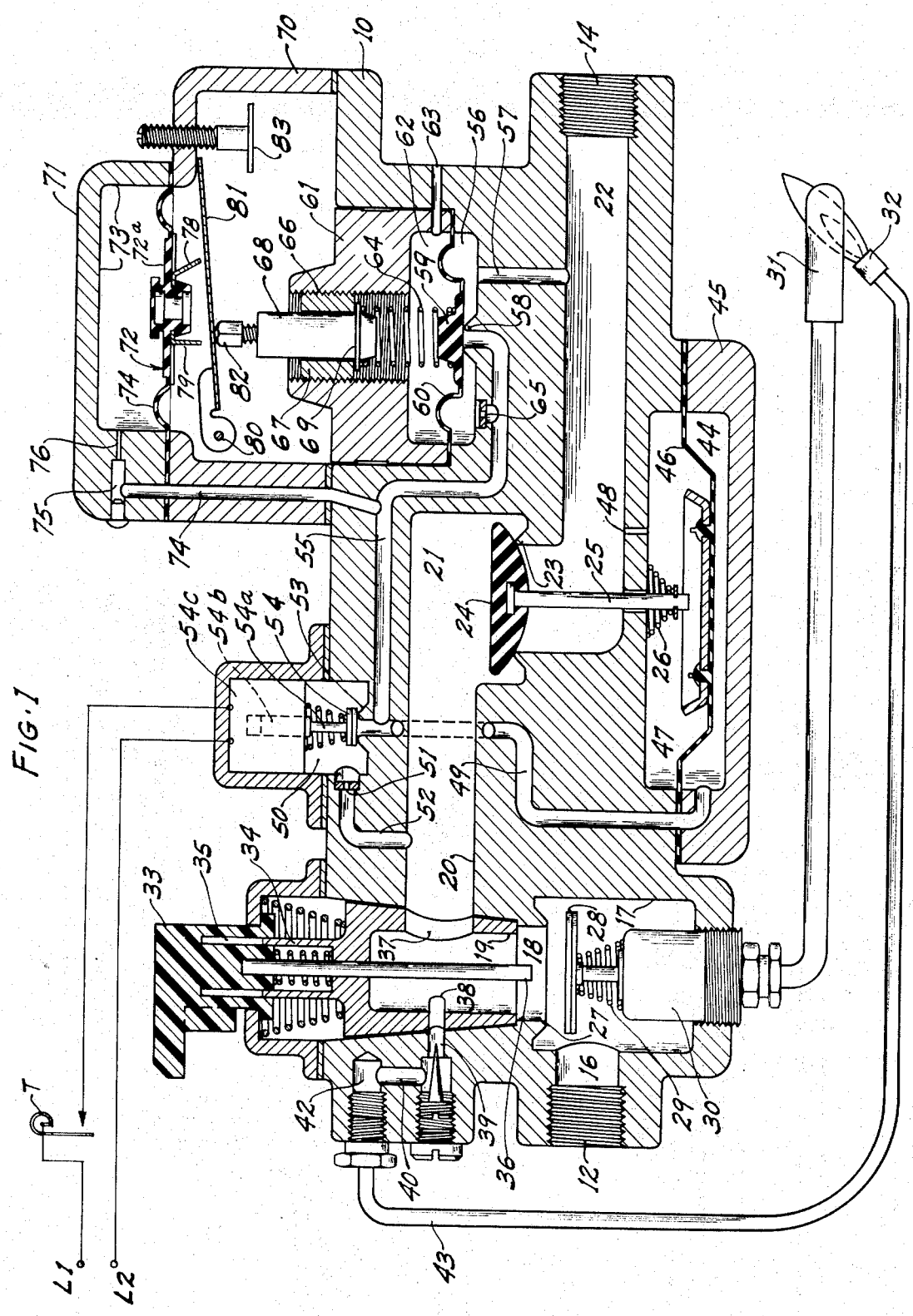
FIG. 1 is a cross-sectional view of a stepped opening, fluid pressure operated gas valve constructed in accordance with the invention.

Referring to FIG. 1 of the drawings, the device includes a main body member 10, having an inlet 12 and an outlet 14. Means comprising a passage 16, a chamber 17, a passage 18, a hollow rotary plug valve 19, a passage 20, a chamber 21, and a passage 22 form a main passageway means connecting inlet 12 with outlet 14. An annular valve seat 23 is formed in chamber 21 and a main valve 24 cooperates with seat 23 to control the flow through the main passageway. The valve 24 has a stem 25 and a spring 26 biases valve 24 in a closed position.

There is an annular valve seat 27 formed at the lower end of the short passage 18 near inlet 12, and a safety cutoff valve 28 cooperates with this seat to cut off all flow through the main passageway, and the burner passageways to be described, in the absence of pilot flame. A spring 29 biases valve 28 toward a closed position. The cutoff valve 28 is held in the open position shown by an electromagnet 30 energized by a thermocouple 31 which is disposed so as to be heated by the flame of a pilot burner 32.

The hollow rotary plug valve 19 has an operating knob 33 axially slidable thereon and keyed thereto for rotation therewith by tangs 34 which enter axial slots 35 in the knob. The knob has an axially depending rod 36 attached thereto which engages and "sets" the cutoff valve 28 in an open position when knob 33 is depressed. The plug valve 19 is further provided with a main port 37 and a pilot port 38 in the wall thereof. The main port 37 aligns with passage 20 when the valve is rotated to the "on" position shown. The pilot burner port 38 registers with a pilot passage 39 when in an on position or when the valve 19 is rotated to a "pilot" position. The port 38 extends circumferentially around the wall of valve 19 sufficiently so that it also registers with pilot passage 39 when the valve 19 is rotated so as to cut off communication through main port 37. Fuel flows from pilot passage 39 to the pilot burner 32 through passages 40 and 42 and conduit 43.

A diaphragm chamber 44 is formed on the lower side of body member 10 by the attachment thereto of a shallow, circular, cup-shaped member 45, and a flexible diaphragm 46 clamped at its periphery between cup member 45 and the main body 10 forms an upper movable wall defining the chamber 44. The main body 10 is cavitated concentrically with chamber 44 to provide a space 47 for the upward flexing of diaphragm 46 and the space 47 is vented to outlet passage 22 through a vent 48.

Communication between diaphragm chamber 44 and inlet 12 is provided by a passage 49, a chamber 50, a restrictive orifice 51, a passage 52, the port 37 and interior of hollow plug valve 19, passage 18, chamber 17 and passage 16. There is a valve seat 53 formed at the upper end of passage 49 in chamber 50 and a biased closed, solenoid operated control valve 54 cooperates with the valve seat 53 for on and "off" control of communication between inlet 12 and diaphragm chamber 44. The control valve 54 has a stem 54a connected to the plunger 54b of a solenoid 54c which when energized opens the valve 54. The solenoid winding is connected across electrical power source terminals $L_1$ and $L_2$ through a space thermostat T.

Communication is also provided between the diaphragm chamber 44 and outlet 14 and comprises a branch passage 55 leading from a point in passage 49 downstream from control valve 54 to a pressure regulator chamber 56 and a passage 57 leading from chamber 56 to passage 22 and thence to outlet 14. A valve seat is formed in chamber 56 at the end of branch passage 55 and a valve 59 cooperates with seat 58. The valve 59 is formed as an integral central portion of a flexible diaphragm 60, and diaphragm 60 is clamped at its periphery between an insert 61 and the body member 10 to form the upper movable wall of pressure regulator chamber 56. The lower surface of insert 61 is cavitated to form a space 62 on the upper side of diaphragm 60 and this space is vented to atmosphere through a vent 63. The pressure regulator valve 59 is biased toward a closed position by a spring 64 and diaphragm 60 is exposed to outlet pressure through passage 57.

Constant communication between main diaphragm chamber 44 and outlet 14 is also provided, irrespective of the position of pressure regulator valve 59, by the provision of a bypass around regulator valve 59. This bypass comprises a short passageway connecting passage 55 directly with the regulator chamber 56 and includes a restricting orifice 65. The orifice 65 is somewhat smaller and more restrictive than orifice 51 in passage 52.

The insert 61 has a central screw threaded bore 66 which receives a screw threaded sleeve 67. A round elongated member 68 slidably mounted in the sleeve 67 has a flange 69 near its lower end against which the upper end of spring 64 abuts. The flange 69 also limits the upward movement of member 68 by the spring 64. It will be seen, therefore, that rotation of the threaded sleeve 67 adjusts the closing bias applied to pressure regulator valve 59. Notches in the upper end surface of sleeve 67 (not shown) are provided to receive a spanner wrench to facilitate adjustably positioning sleeve 67.

A housing member 70 is suitably attached to the upper surface of main body member 10 and an inverted cup-shaped closure member 71 is suitably attached to the upper surface of housing member 70. A flexible diaphragm member 72 clamped at its periphery between cup-shaped member 71 and the upper surface of housing 70 forms the lower flexible wall of an expansible chamber 73. Communication between the branch passage 55 and the chamber 73 is provided by passages 74 and 75 and a calibrated restrictive passage 76. Chamber 73 is therefore in constant communication with the main diaphragm chamber 44 via passage 49 and with the outlet 14 via orifice 65, the pressure regulator chamber 56, and passage 57. Chamber 73 is also, therefore, in communication with inlet 12 when solenoid operated control valve 54 is open and is in further communication with outlet 14 when pressure regulator valve 59 is open.

Figure 3:
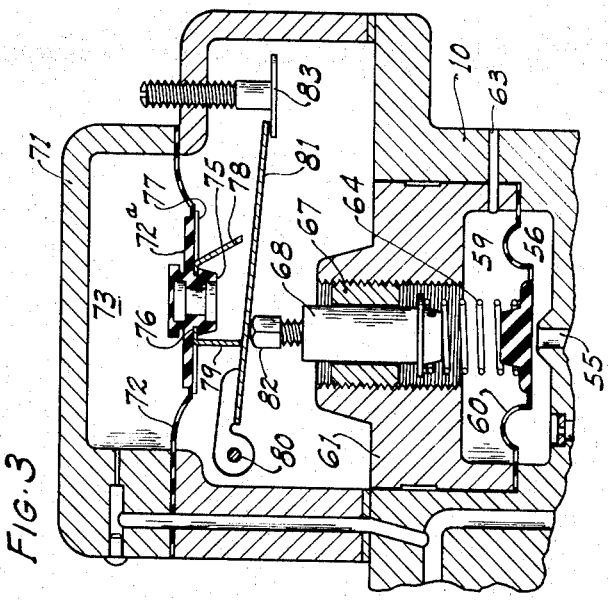
FIG. 3 is a fragmentary cross-sectional view showing the pressure regulating means in an operative position, which it subsequently assumes when greater operative pressure is applied to the pressure responsive actuator.
Figure 5:
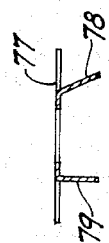
FIGS. 4 and 5 are top plan and cross-sectional views, respectively, of the contacting element carried by the pressure responsive actuator diaphragm.
Figure 4:
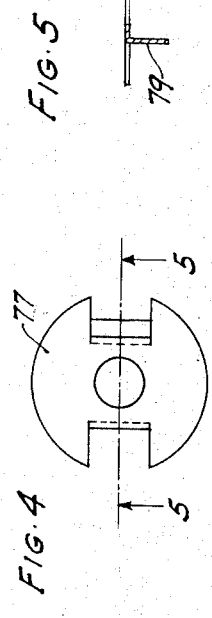
Figure 2:
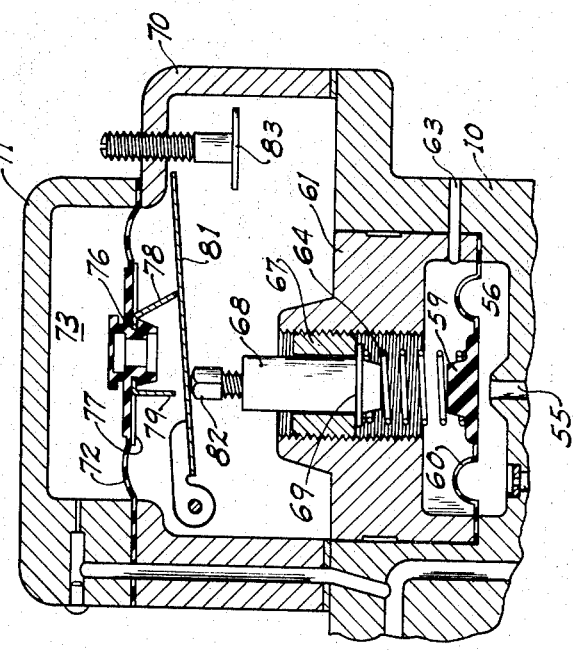
FIG. 2 is a fragmentary cross-sectional view showing the pressure regulating means in an operative position, which it assumes when an initial relatively low operating pressure is applied to the pressure responsive actuator.

The diaphragm 72 is formed of a resilient material, such as silicon rubber, and is provided with an annular corrugation 74 which functions to restore the diaphragm to the shape shown in FIG. 1 when it is released from distortions shown in FIGS. 2 and 3. Diaphragm 72 is further provided with a hub portion 75 having an annular groove 76 which receives a washer-like contacting element, see FIGS. 4 and 5. The element 77 has legs 78 and 79 provided by downwardly forming partially detached portions of member 77, see FIGS. 2 and 3.

Pivotally mounted in the wall of housing 70 on a pivot pin 80 is a lever 81 which underlies the member 77. The lever 81 is normally supported in the position shown in FIG. 1 by an adjustable underlying pin 82 threadedly engaged in the vertically slidable and upwardly biased member 68. In this position the lever extends from its pivoted end to its free end in an upward inclination from the horizontal, its free end abutting a lower surface of the housing 70, as shown in FIG. 1.

When pressure in chamber 73 causes diaphragm 72 to move downward, leg 78 will first engage lever 81 at some point outward toward its free end from the point of contact therewith of the underlying pin 82, as shown in FIG. 2. As further increasing pressure causes further downward movement of diaphragm 72, the lever 81 will approach a horizontal position and leg 79 will now engage the lever 81 at some point between its pivoted end and the underlying pin 82. As the diaphragm continues to move downward, the movement will be transmitted to lever 81 through leg 79 until the lever reaches the downwardly inclined position shown in FIG. 3.

It will be seen, therefore, that a greater downward force, with less movement, is imparted to the pin 82 during initial downward flexing of the diaphragm 72 and that greater movement, with less force, is applied upon subsequent further downward flexing of the diaphragm. This is an essential feature of the invention inasmuch as the initial available pressure to effect the initial downward movement of the diaphragm 72 and the initial compression of spring 64 is relatively small whereas the subsequent available pressure resulting from the initial compression of spring 64 will be considerably greater. The central thickened portion 72a of diaphragm 72 and the thinner annular portion forming the corrugation 74 results in substantially vertical downward movement of the member 77 and legs 78 and 79 as the diaphragm flexes downward due to increasing pressure in chamber 73. The downward movement of the free end of lever 81 is limited by the flanged head of an adjustment screw 83.

OPERATION

The device is shown in FIG. 1 in an on position. In this position, the main port 37 of hollow plug valve 19 is in registry with passage 20 and the pilot port 38 is in registry with pilot passage 39. Also, the pilot burner is burning and cutoff valve 28 is being held open by electromagnet 30. However, space thermostat T is open so that solenoid operated control valve 54 is biased closed and communication between inlet 12 and main diaphragm chamber 14 is closed. Since main diaphragm chamber 44 is constantly vented to the outlet via the orifice 65, the diaphragm chamber is exhausted and diaphragm 46 is in its lowest position and main valve 24 is biased closed. Also, the expansible chamber 73 of the actuator above the regulator valve 59 will be exhausted, with actuator diaphragm 72 assuming its free formed shape and with legs 78 and 79 of member 77 spaced somewhat from underlying lever 81. Also, the pressure regulator valve 59 is closed with the biasing spring 64 entering a closing bias thereon predetermined by the adjusted position of threaded sleeve 67.

Under these conditions, when space thermostat T closes due to a drop in temperature, solenoid 54c is energized and control valve 54 is opened, thereby placing main diaphragm chamber 44 in communication with inlet 12 and with a source of gas supply under pressure to which the device is connected. The constant venting orifice 65 being smaller and more restrictive than orifice 51, the pressure in diaphragm chamber 44 now increases causing diaphragm 64 to flex upward and to engage and move main valve 24 openward against spring 26. When main valve 24 moves openward, the pressure in outlet passage 22 increases and this pressure is applied to pressure regulator diaphragm 60 through passage 57, causing regulator valve 59 to move openward. Opening of pressure regulator valve 59 results in the increased venting of the diaphragm chamber 44 by some amount predetermined by the adjusted biasing force of regulator spring 64, which limits the opening movement of main valve 24 to that which will permit such flow thereby as will maintain a predetermined relatively low outlet pressure.

Also, at the time control valve 54 opens, the resulting pressure in the branch bleed passage 55 will be communicated to the expansible chamber 73 through passages 74 and 75 and restricted passage 76, causing the diaphragm 72 to flex downward and, after a short delay, the leg 78 will engage the lever 81, as indicated in FIG. 2. It will be seen that the pressure available to expand chamber 73 at this time is relatively low and that the force multiplication provided by the relationship of the points of contact of leg 78 and pin 82 with respect to the pivot of lever 81 compensates to assure an initial downward movement of lever 81 and a substantial initial increase in the biasing force of regulator spring 64.

Increasing the biasing force of regulator spring 64 reduces the venting past regulator valve 59 and increases the pressure available to expand chamber 73. As expansion of chamber 73 continues, lever 81 approaches a horizontal position and leg 79 now contacts lever 81 at some point closer to pivot 80. Thereafter, downward movement is imparted to the slidable member 68 at a greater rate as chamber 73 continues to expand. This arrangement insures adequate compression of pressure regulator spring 64 without excessive flexing of diaphragm 72, and inasmuch as adequate pressure is now available to overcome the resistance of spring 64, the initial force multiplication may be dispensed with.

When the free end of lever 81 has moved downward into engagement with the flange of adjustable screw 83, as indicated in FIG. 3, the biasing force of regulator spring 64 will have been increased to a value which will effect such positioning of main valve 24 so as to permit a predetermined full flow of gas thereby. Thereafter, this full flow of gas will be regulated until control valve 54 is again closed. When control valve 54 is closed, the diaphragm chamber 44 and actuator chamber 73 exhaust to the outlet through orifice 65 inasmuch as regulator valve 59 will close under the bias of spring 64 before these chambers can be exhausted. The spring 64 will also return the lever 81 to its FIG. 1 position, and diaphragm 72 will return to its free form position when chamber 73 becomes exhausted.

In diaphragm-operated gas valves of the kind shown in United States Pat. No. 3,235,180, wherein exhaustion of the diaphragm chamber 40 effects opening of the main valve instead of closing it as in applicants' valve, it will be apparent to those skilled in the art that the pressure responsive actuator chamber 73 will have to be connected to the outlet rather than to the diaphragm chamber. When the actuator chamber 73 is connected to the outlet, the available pressure increases as the biasing force of the regulator spring increases just as it does when connected to the diaphragm chamber. There is, of course, always slightly greater pressure existing in the diaphragm chamber than at the outlet under operating conditions in applicants' arrangement, and it is for this reason that applicants connect chamber 73 with the diaphragm chamber. Other than this advantage, applicants' device will function satisfactorily if chamber 73 is connected directly to the outlet passage 22.

We claim:

1. A step-opening, diaphragm-operated gas valve having a valve operating diaphragm forming the movable wall of a chamber and being normally subjected to equal pressure on opposite sides thereof to permit closure of a biased closed gas valve operatively connected thereto, in which upstream pressure is applied to the chamber through a first passage at a predetermined rate and is bled off to a downstream zone through a second passage controlled by a spring biased regulator valve at a rate which effects partial opening of the gas valve when a normally closed control valve in said first passage is opened, and in which a delayed action pressure responsive actuator is responsive to the pressure existing in said diaphragm chamber to increase the spring biasing force on said pressure regulator valve thereby to increase the pressure in said chamber and effect further opening movement of said gas valve; the improvement which comprises providing motion transmission means including pivoted lever means between the said pressure responsive actuator and said regulator biasing spring, the arrangement being such that said lever is engaged by said actuator at a point thereon more remote from its pivoted axis than that point thereon operatively engaging said regulator biasing spring, whereby the force applied by said actuator to said spring is multiplied.

2. The gas valve claimed in claim 1 in which said lever is biased to a position inclined toward said actuator with respect to a plane perpendicular to the line of motion of said actuator, whereby multiplication of the force applied to said regulator spring decreases and the rate of motion imparted thereto increases as said actuator moves said lever toward said perpendicular plane.

3. The gas valve claimed in claim 1 in which said lever is biased to a position inclined toward said actuator with respect to a plane perpendicular to the line of motion of said actuator and in which said actuator includes two laterally spaced contacting elements lying in said perpendicular plane, one of said contacting elements engaging said lever at a more remote point from its pivotal axis when said lever is in said inclined position, both of said contacting elements engaging said lever when said lever is moved by said actuator to a position parallel with said perpendicular plane, and the other of said elements engaging said lever when said lever is moved by said actuator to an opposite inclined position, whereby multiplication of the force applied to said actuator spring diminishes and multiplication of movement imparted to said actuator spring increases as said actuator progressively responds to increasing pressure in said diaphragm chamber resulting from increasing force applied to said regulator biasing spring.

* * * * *